No. 831,885. PATENTED SEPT. 25, 1906.
G. METCALFE.
HARROW.
APPLICATION FILED JULY 25, 1906.
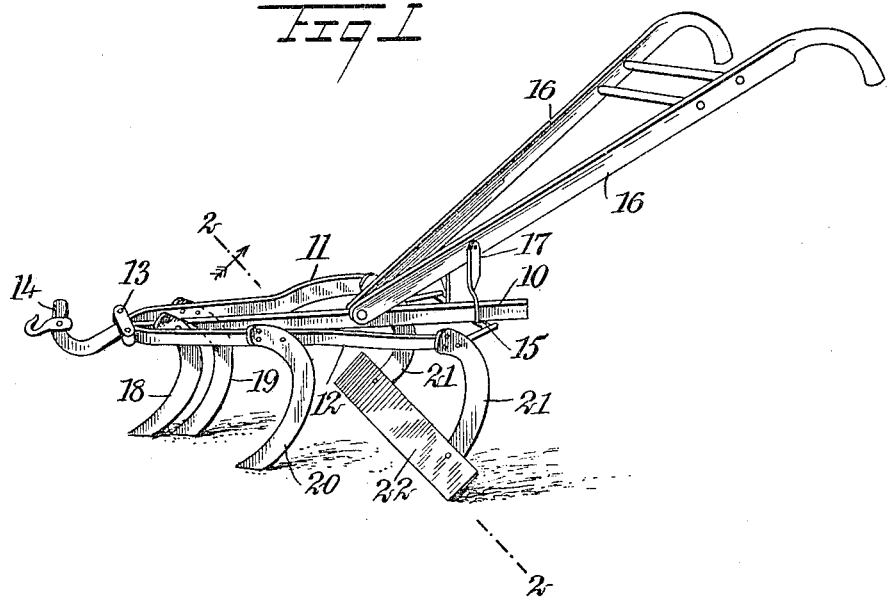
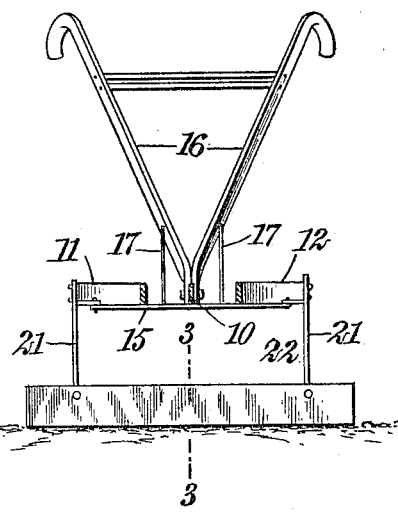
WITNESSES
INVENTOR
George Metcalfe
BY
ATTORNEYS

UNITED STATES PATENT OFFICE.

GEORGE METCALFE, OF WILCZINSKI, MISSISSIPPI.

HARROW.

No. 831,885.

Specification of Letters Patent.

Patented Sept. 25, 1906.

Application filed July 25, 1906. Serial No. 327,657.

*To all whom it may concern:*

Be it known that I, GEORGE METCALFE, a citizen of the United States, and a resident of Wilczinski, in the county of Washington and State of Mississippi, have invented a new and Improved Harrow, of which the following is a full, clear, and exact description.

The purpose of my invention is to provide a harrow primarily intended for the preparation of the soil in cotton culture in such flat and damp sections of the country as the Yazoo and Mississippi delta and which will combine with a harrow the qualities of a cultivator whereby to remove from bedded lands all grass, weeds, and clods and leave a smooth and level surface for planting, which cannot be accomplished with either the ordinary harrow or a cultivator.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the figures.

Figure 1 is a perspective view of the improved implement. Fig. 2 is a section taken on the line 2 2 of Fig. 1, and Fig. 3 is a section through the harrow-blade, taken substantially on the line 3 3 of Fig. 2.

The frame of the implement consists of a central beam 10 and side beams 11 and 12, which at their forward ends are secured to the central beam 10 by a clip 13 or its equivalent, and said side beams 11 and 12 diverge rearwardly. The forward end 14 of the center beam 10 is more or less curved and adapted for connection with a draft device, and the side beams 11 are connected at the rear by a cross-bar 15. The handles 16 are secured one to each side of the center beam 10 between the ends of the latter, and the handles are supported between their ends by upright braces 17, secured to the handles and to the said cross-bar 15.

A bull-tongue blade 18 is secured to the center beam 10 adjacent to the forward ends of the side beams 11 and 12, and two other bull-tongue blades 19 and 20 are secured one to each of the side beams 11 and 12 between their ends and somewhat to the rear of the central and forward blade 18, as clearly shown in Fig. 1.

Downwardly and forwardly curved standards 21 are secured to the rear end portions of the side beams 11 and 12, and a harrow-blade 22 is bolted or otherwise secured to the lower ends of the standards 21 at their forward faces. The said blade 22 is beveled at 23 at its lower rear portion, so as to make the lower edge of the blade a cutting or scraping blade. The blade 22 has bearing on the ground throughout its length and is the same distance from the frame at each end. Said blade 22 extends beyond the sides of the frame and transversely thereof or at right angles to the center beam 10.

The three front blades or teeth penetrate the top of a row to the depth of four to six inches, extending entirely across the row, thus reaching and removing all undecayed stalks and the branches thereof lying either across or parallel with the row and which would necessarily come in contact with the plow when "off-barring."

The bull-tongue blades, in addition to removing the undecayed stalks, pulverize to a great extent the clods on the row where the land has been broken in wet weather and loosen all grass and weeds growing on the top of the row. The blade 22 levels the surface on the top of the row, filling in all depressions caused by the upturning of clods by the three bull-tongue blades, and at the same time the harrow-blade 22 cuts loose all grass which may have escaped the bull-tongue blades and throws the stalks brought to the surface by the bull-tongue blades and also the larger clods into the "water-furrow," thus leaving a clean, even, level, and flat surface on which a cotton-planter can run with the certainty of a perfect stand.

Having thus described my invention, I claim as new and desire to secure by Letters Patent—

1. A harrow comprising a frame, handles therefor, bull-tongue blades secured to the forward portion of the frame, standards downwardly and forwardly curved from the rear side portions of the frame, and a blade secured to the forward edges of said standards at their lower edges, which blade is at right angles to the longitudinal axis of the frame and has even bearing on the surface throughout its length.

2. A harrow, consisting of a frame, handles secured to the frame, bull-tongue blades secured to the forward portion of the frame, one blade centrally in advance and two other blades one at each side of the frame to the rear of the advanced blade, downwardly and forwardly curved standards secured to the side portions of the said frame, and a straight blade secured to the lower forward end portions of the standards, which blade is of greater width than the greatest width of the frame and extends transversely of the frame at right angles to its longitudinal axis and has even bearing on the surface over which the implement is drawn, the said blade having its lower rear portion beveled at its longitudinal edge for the purposes set forth.

In testimony whereof I have signed my name to this specification in the presence of two subscribing witnesses.

GEORGE METCALFE.

Witnesses:
 RAY JOHNSON,
 J. L. JONES.